Dec. 15, 1931.   W. DUBILIER   1,836,707
ELECTRICAL CONDENSER
Filed April 29, 1926
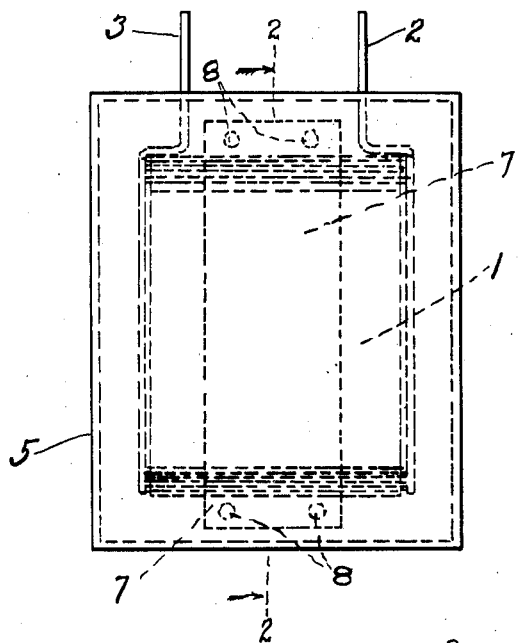
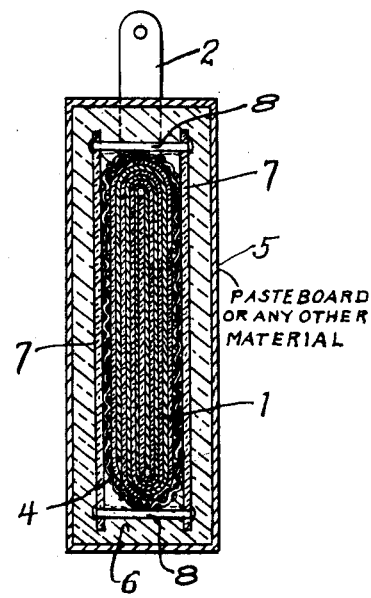
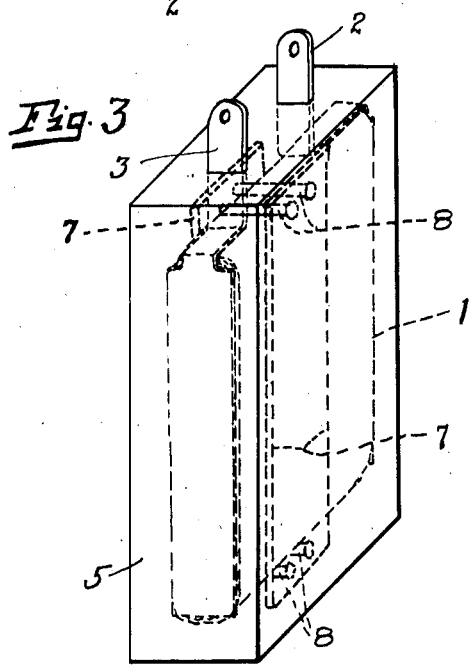
INVENTOR
William Dubilier
BY
William F. Nickel
ATTORNEY.

Patented Dec. 15, 1931

1,836,707

UNITED STATES PATENT OFFICE

WILLIAM DUBILIER, OF NEW ROCHELLE, NEW YORK, ASSIGNOR TO DUBILIER CONDENSER CORPORATION, OF NEW YORK, N. Y., A CORPORATION OF DELAWARE

ELECTRICAL CONDENSER

Application filed April 29, 1926. Serial No. 105,600.

This invention relates to improvements in electrical condensers; particularly electrical condensers which can be impregnated with a suitable insulating material.

An object of this invention is to provide a condenser of the type which can be obtained by rolling or winding the parts together in the required shape and then impregnating the body of the condenser in oil or the like substance. A condenser so impregnated, can be embedded in an insulating material having a high melting point, such as paraffin, sealing wax, or some suitable substance, which will prevent the spreading or separation of the conducting and insulating parts upon an increase in temperature taking place.

The drawings disclose a preferred form of my invention, but I reserve the right to make any changes which come within the scope of the principle by which the invention is controlled.

On said drawings:—

Figure 1 is a front view of a finished condenser according to my invention.

Figure 2 is a section on the line 2—2 of Figure 1; and

Figure 3 is a perspective view of such condenser when completed.

The same numerals identify the same parts throughout.

The numeral 1 indicates the body of the condenser, which may be made up by disposing in proper position thin strips or sheets of electrical conductive material separated by sheets of insulation such as paper, and rolling or winding the parts into shape. Condensers of this design are well-known and the particular manner in which the sheets or elements of conductive material and insulation are arranged, forms no part of my invention. Usually the sheets of conductive material, such as metal foil, and sheets of insulation are wound on a shaft or a mandrel in such a way that the edges of the turns of the conductive elements or sheets of opposite polarity project from the opposite ends of the roll or body so made, and strips of conductive material can be attached by solder or otherwise to the elements of opposite polarity, to provide terminals for the condenser indicated at 2 or 3. Over the body of such a condenser can be disposed a sheath or cover of insulation of any suitable material, such as cloth or paper or pasteboard, indicated at 4 in Figure 2, but such a sheath can be omitted if desired. I can also utilize with the body of such a condenser a suitable clamp hereinbelow described, to keep the parts of the body of the condenser under the required degree of compression. When the body 1 is formed, it is impregnated with oil which pervades it, and particularly the insulation therein which separates the conductive sheets of opposite polarity, the oil penetrating the minute interstices of the fiber of the paper or other insulating substance which may be employed. After impregnation with oil, the body of the condenser with or without the sheath 4, and with or without the clamp to keep the body under compression, is disposed in a casing or housing 5, and then the casing is filled with wax 6, such as paraffin or sealing wax, which solidifies on cooling. The casing 5 may be a pasteboard box, or a container of any other material, and it will have openings through which the terminals 2 and 3 extend to the outside thereof so as to permit the condenser to be joined to the circuit in which it is to operate.

A condenser made in this way has the advantages of the use of paraffin or sealing wax for the purpose of embedding the condenser in its container 5, but by dispensing with paraffin as a medium for impregnating the body of the condenser 1, I avoid the drawbacks which the presence of paraffin sometimes entails; for example, to impregnate the body 1 with wax of any kind would require the melting of the wax, which on solidifying would tend to create mechanical stresses in the body 1 of the condenser and thus damage the insulation. Oil on account of the fact that it remains in liquid condition, impregnates the body of the condenser just as well, but creates no stresses and no risk of damage to the condenser can thus arise. It is obvious, however, that a body which has been previously impregnated with paraffin or other similar compound can again be impregnated by oil, thus eliminating any voids which may be present. By raising the temperature of the oil during impregnation to a point where the paraffin is softened the two substances will coalesce and, as the wax solidifies and contracts, the oil will follow up and prevent the formation of voids.

The advantages of my invention will appear more fully upon consideration of the temperatures and other conditions prevailing in the use of paraffin wax for impregnating a condenser. The wax must be heated at least enough to melt it, and it is also necessary to heat the condenser quite highly to expel the air and moisture. Waxes all have a large coefficient of expansion and when a condenser impregnated with wax cools, the wax solidifies and contracts allowing small cracks and voids to appear in the condenser, especially at the ends. The hardening of the wax also gives rise to stresses in the condenser, in addition to the cracks and voids; and the condenser may thus be injured and caused in time to break down. But the oil impregnating the body of the condenser in my invention will not harden or give rise to strains, and will not cause any voids or cracks to appear; but will fill the body of the condenser and all minute openings in the paper and between the layers of paper and foil, thus sealing the condenser against the entrance of air and moisture. When the body of the condenser 1 so impregnated with oil is afterwards embedded with wax it is sealed entirely but the wax cannot create any stresses and no injury to the condenser can occur. The outside embedment of wax also permits the handling of the unit for testing or inspection if desired before the same is enclosed in a permanent outer casing.

In condensers using paraffin or other similar wax as an impregnating compound, it has long been observed that a unit which has satisfactorily withstood a potential of several times its rated value during the test period is liable to break down in service after a lapse of time, although no excessive potentials have been applied. This has been a source of considerable annoyance and expense, and has never been satisfactorily explained. I believe, however, that the presence of voids in the body permits of ionization which gradually increases as the period of service lengthens and finally results in a breakdown of the dielectric.

If a clamp is included, it may be of the type indicated and embodies two members 7 held by screws or other fastening means 8, the members 7 pressing upon the opposite faces of the body of the condenser 1. This clamp may be employed with the covering 4 and put on the condenser over this covering, or the covering or sheet 4 may be omitted and the clamp used alone; or as stated above, the clamp may be omitted and the sheet 4 included.

By "impregnating" a condenser I refer to the method of causing substantially all voids within the body including the spaces between the layers and within the dielectric material itself to be replaced or filled with an insulating compound. By an "impregnated" condenser body I refer to one in which there is an actual impregnation, as above, of the assembled or wound body as distinguished from one in which the dielectric material may be treated before the body is assembled.

Having described my invention, what I believe to be new and desire to secure and protect by Letters Patent of the United States is:—

1. The combination of a condenser unit comprising a formed body of foils separated by fibrous dielectric sheets, said body being impregnated with oil which is liquid at normal temperatures to keep the same in pliable condition and prevent the formation of voids and strains within the body, clamping means for applying pressure to the body, a casing enclosing said unit and clamping means, and an imbedding wax compound filling the space between said casing and unit, said imbedding compound being sufficiently hard at normal temperatures to substantially maintain the impregnated condition of the body.

2. The combination of a condenser unit comprising a body of armature elements separated by dielectric material, said unit being impregnated with an insulating compound which is liquid at normal temperatures, a container enclosing said impregnated unit, and an insulating imbedding compound which is hard at normal temperatures filling the space between said body and container.

3. The combination of a condenser unit comprising a body of armature elements separated by dielectric material, said unit being impregnated with an insulating compound which is liquid at operating temperatures, a casing enclosing said impregnated unit, and an insulating compound which is relatively hard at operating temperatures between the casing and unit and imbedding the latter, and adapted to substantially maintain the impregnated condition of the unit.

4. The combination of a condenser unit comprising a body of armature elements separated by fibrous dielectric material, said unit being impregnated throughout at least its outer portions with a fluid oil which has good insulating properties and high penetrability, a container enclosing said impregnated unit, and an embedding wax filling the space between said container and unit.

5. The combination of a condenser unit comprising a formed body of foils separated by fibrous dielectric sheets, said body being impregnated with an insulating compound which is fluid at normal temperatures to substantially prevent the formation of voids or strains within the body, a casing enclosing and positioning said unit, and an imbedding compound filling the space between said casing and unit, said imbedding compound being hard at normal temperatures and serving to substantially maintain the shape of the body and the impregnated condition of the same.

6. The combination of a condenser unit comprising a body of foils separated by paper sheets, said body being impregnated throughout at least its outer portions with an oil which is liquid at normal temperatures and which has good insulating properties and high penetrability, a casing for enclosing and positioning said unit, and an imbedding paraffin wax compound filling the space between said casing and unit.

7. A condenser having a body which is impregnated with oil which is liquid at normal temperatures, and which has high penetrability, and enclosed in a casing which is not oil proof, and a wax compound between the casing and the body to substantially maintain the impregnated condition of the body and prevent the escape from the casing of said impregnating oil.

8. A condenser comprising a wound body of foils separated by paper sheets and forming a structure having minute interstices therein, the body being impregnated throughout at least its outer portions with an oil which is liquid at normal temperatures and which has good insulating properties and high penetrability, a container enclosing said impregnated body, and an imbedding petroleum wax compound filling the space between the container and condenser body.

In testimony whereof I affix my signature.

WILLIAM DUBILIER.